CHANCE SELECTION WORD GAME

Original Filed Sept. 1, 1950

INVENTOR
RAYMOND A. WITHERS
BY Naylor and Lassegne
ATTORNEYS

United States Patent Office

Re. 24,409
Reissued Dec. 24, 1957

24,409

CHANCE SELECTION WORD GAME

Raymond A. Withers, San Mateo, Calif., assignor to Joseph E. White, Rockford, Ill.

Original No. 2,684,853, dated July 27, 1954, Serial No. 182,832, September 1, 1950. Application for reissue June 6, 1955, Serial No. 513,621

7 Claims. (Cl. 273—135)

Figure 1:
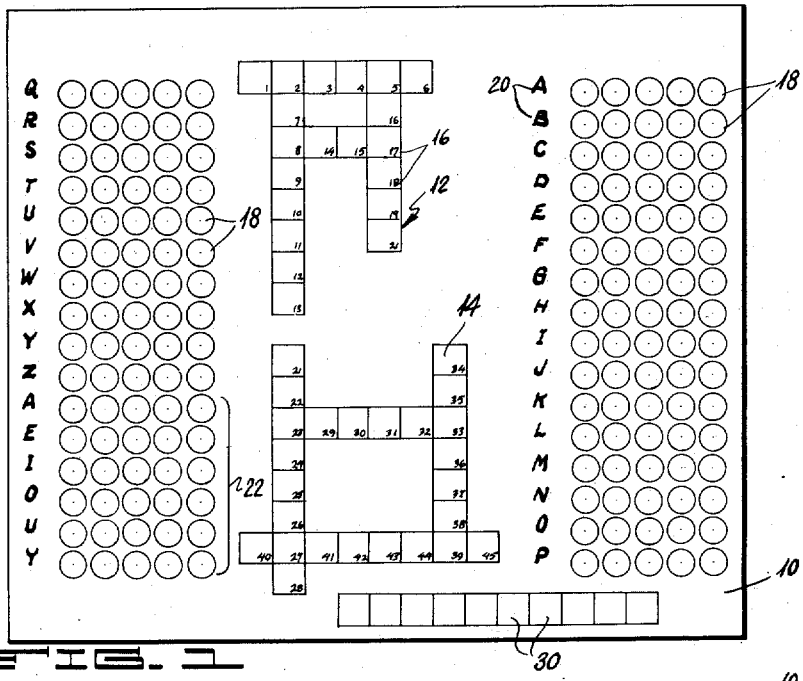

Matter enclosed in heavy brackets [ ] appears in the original patent but forms no part of this reissue specification; matter printed in italics indicates the additions made by reissue.

This invention relates to word games, and more particularly to a form of word game combining the essential features of a crossword puzzle and a punch-out or punch-board device. [The essential object of the invention is the provision of a new and novel game or amusement device particularly adapted for group entertainment.]

In summary, the word game of the invention is embodied in a game card or board having displayed thereon a crossword puzzle type pattern of numbered squares which extend both vertically and horizontally, but which may be disposed in any desired geometrical pattern according to the inter-related combinations of the pre-selected words which are to be filled in in order to solve the puzzle or end the game. Means are provided on the card or board to correlate the number appearing in each square with a particular letter of the alphabet, and such means preferably comprises a group of punch-outs or pips for each letter of the alphabet, which pips, upon removal, disclose either a number corresponding to the number of one of the squares, or no number at all. The object of the game is to complete the filling in of the crossword squares with the fewest number of misses, i. e., with the removal of the fewest number of blank pips.

Figure 2:
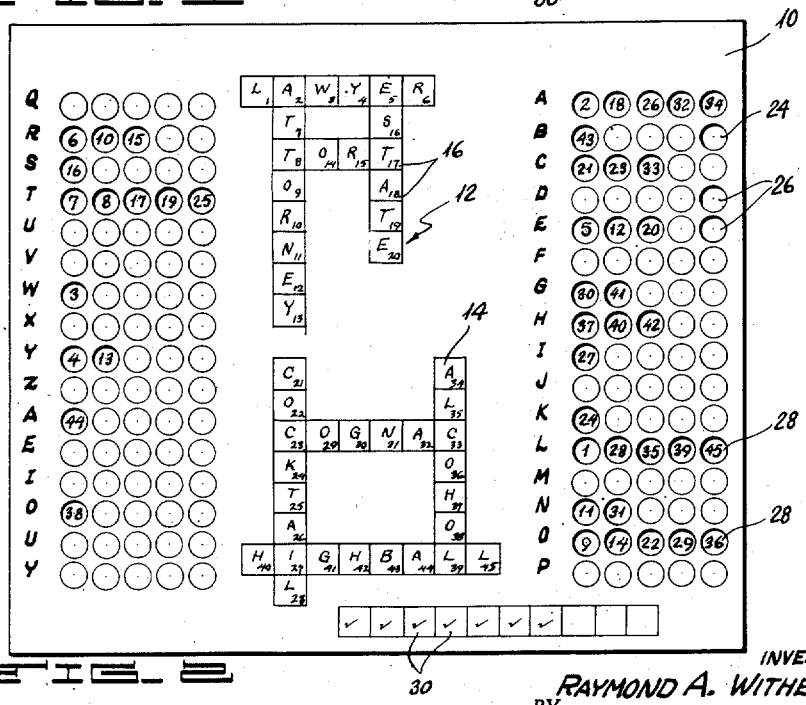

Other objects and advantages of the invention will be apparent from the following description taken in conjunction with the drawing forming part of this specification, and in which:

Figure 1 is a view of a game card embodying the invention, showing the card as it appears before commencement of the game; and Figure 2 is a similar view of the game card as it appears after the game has been completed, i. e., showing the pips removed and the cross-word squares filled in with their letters.

Referring to the drawing, a card or sheet 10 has printed, or otherwise placed thereon, a crossword puzzle pattern indicated generally at 12 comprising a plurality of adjacently located squares 14 identified by numbers 16 located in the corners of the squares. Each horizontal and vertical group of aligned squares is to be filled in with a pre-selected word.

The means for ascertaining the identity of letters to be placed within the numbered squares 14 to thereby spell out the pre-selected words comprises a plurality of groups of *openable windows herein disclosed as in the form of* punch-outs or pips 18 defined in card 10 by circular score or cut lines, with at least one group being provided for each of the letters of the alphabet, as indicated by the letter indicia 20. Preferably, extra groups of punch-outs 22 are provided for the vowels of the alphabet and for such of the consonants, as for example, the letter Y, as are likely to occur the greatest number of times in the words of the crossword pattern. The card 10 is preferably provided with a backing card or sheet, seen at 24 through the apertures in card 10 resulting from the removal of the punch-outs 18, and the portions of the backing card 24 underlying the punch-outs 18 are either blank, as indicated at 26, or have numbers, indicated at 28, printed thereon. The numbers provide for correlation between particular squares 14 of the cross-word pattern and particular letters of the alphabet.

The card 10 may also be provided with scoring means comprising, for example, a number, such as 10, of squares 30 identified by the word "Misses." Since it is preferable to play the game according to the object of filling in the squares 14 before a certain number of misses, such as 10, have been experienced by the contestant or played, the squares 30 may be used to receive pencilled check marks, or actual pips 18, each time a pip has been removed to disclose a blank space 26 on the underlying card 24. Thus, in order to win the game or be successful the contestant or individual player must fill in all of the squares 14 with their appropriate letters before he has recorded ten misses.

It is preferable to have the numbers appearing in each of the punch-out groups beginning at the left end of the group and continuing in unbroken succession until the particular letter for the group has been exhausted, and, also, to have the lowest number in any group appear at the left with successively higher numbers in proper left to right sequence in the group, as this furnishes some means enabling the individual player to judge whether or not to punch out a further pip from a group. That is, knowing the number of the squares in the crossword pattern, and hence the magnitude of the highest number involved, knowing the magnitude of the number last disclosed in a particular group by the punching out of a pip, and being able to judge whether or not a particular consonant or vowel is likely to appear a greater number of times than already indicated, the player can gauge the risk of a miss upon further removal of pips within a group. In order that this may be so, the removal of the pips must take place in sequence from left to right within a group, although the player need not continue to punch out within any group, and, of course, may select from any one of the groups present.

From the foregoing, the procedure of playing the game of the invention will be clear. It will be further obvious that a number of modifications or adaptations of the procedural aspects of the game may be readily devised. The game is particularly adapted for audience participation use, as, for example, on television, with the viewers sending in their own devised diagrams or cards for solution and with a panel of contestants endeavoring to solve the game in a given number of chances, it being understood that after a certain point has been reached in filling in the letters of the diagram the balance of the letters, depending upon the number, identity and placement of the letters already disclosed and upon the individual skill of the contestant, may be arrived at without further punching out of the pips.

While a specific embodiment of the invention has been shown and described, it is to be understood that all substantial equivalents of said embodiment are within the scope of the invention.

What I claim as new and desire to secure by Letters Patent is:

1. A device of the class described comprising a face card, a crossword diagram thereon made up of individual squares, a separate number in each square identifying the same, a plurality of cut line-defined punch-outs formed on the card for each of the letters of the alphabet and designated by their letter, a backing card secured to said face card and having portions thereof adapted to be uncovered for viewing upon removal from said face card of said punch-outs, and numbers on said backing card corresponding to the numbers of the squares of said crossword diagram disposed on some of said backing card portions beneath pre-selected ones of said punch-outs.

2. A device of the class described comprising a face card, adjacently located squares thereon adapted to be filled in with letters of the alphabet to spell out preselected words, distinctive indicia for the squares serving to separately identify each square, a group of cut line-defined punch-out pips formed in the card for each of the letters of the alphabet, alphabetical indicia on the card identifying each group of pips, a backing card secured to said face card, said backing card having thereon in underlying relation to some of said pips indicia corresponding to said distinctive indicia for the squares, said backing card indicia being adapted to be disclosed to view upon removal of the pips associated therewith from said face card.

3. A device of the class described comprising a face card, a crossword puzzle type diagram thereon having a separate number in identifying relation to each of the squares thereof, a row of cut line-defined punch-out pips formed in the card for each of the letters of the alphabet, a letter of the alphabet imprinted on the card in identifying relation to each of the groups of punch-out pips, a backing card secured to said face card, said backing card having imprinted thereon in underlying relation to some of said pips numbers corresponding to the numbers of the squares of said diagram, said backing card numbers being adapted to be disclosed to view upon removal of the pips associated therewith from said face card, the numbers on the backing card in underlying relation to each row of pips being arranged so that no blank pip-disclosed spaces occur therebetween, and with the numbers arranged so that the number of the lowest magnitude within a row is located at a predetermined end of the row, and with the numbers of successively higher magnitude being located in successively ordered relation to said lowest magnitude number.

*4. A device of the class described comprising a face card and a backing card secured thereto, said face card having thereon a word diagram made up of a row of individual squares for the letters of the word, each of which squares has an identifying number, said face card also having a plurality of cut line-defined punch-out pips formed therein which when opened expose uncovered portions of the backing card, there being one of such pipe for each of the letters of the alphabet and designated by these letters, said backing card having portions normally covered but adapted to be uncovered by opening said pips, and numbers on said backing card corresponding to the numbers of the squares of said word diagram disposed on only those portions of said backing card that are arranged to be uncovered by the opening of only such of said pips as are designated by letters which occur in the word to be formed by the letters placed in said row of squares.*

*5. As an article of manufacture, a word game device comprising a front sheet of suitable material overlying and connected with a back sheet of suitable material, said front sheet having on one portion thereof a blank word diagram made up of a row of squares for as many letters as a word selected contains, these squares bearing identifying indicia, said front sheet having formed therein on another portion thereof cut line-defined punch-out pips, one for each of the letters of the alphabet and accordingly designated by letter, said back sheet having a portion covered by the last mentioned portion of said front sheet having indicia applied thereto corresponding to the identifying indicia on the squares on the front sheet and spaced to register with only those pips on the front sheet having letter designations corresponding to those letters of whatever word is preselected for insertion eventually in the aforesaid word diagram.*

*6. As an article of manufacture, a word game back sheet on a portion of which a series of indicia identifying the letters and their location in a word to be guessed by a player are inscribed in a predetermined spaced relationship, and a word game front sheet adapted to be secured to the back sheet in superimposed relationship thereto, said front sheet having one portion thereof marked off in spaces for inscription of the letters of the aforesaid word as the letters are determined by a player, and another portion which is arranged to overlie the indicia bearing portion of the back sheet and having cut line-defined punch-out pips formed therein, some of which register with the indicia on the back sheet, there being at least one such pip for each of the letters of the alphabet and accordingly designated by letter.*

*7. A device of the class described comprising a face card and a backing card secured thereto, said face card having thereon a word diagram made up of a row of individual squares for the letters of the word, said face card also having provided thereon a plurality of cut line-defined punch-out pips formed therein which when opened expose uncovered portions of the backing card, there being at least one such pip for each of the letters of the alphabet and designated by these letters, said backing card having portions normally covered but adapted to be uncovered by opening said pips, and numbers designating squares of said word diagram arranged to be uncovered by the opening of only such of said pips as are designated by letters which occur in the word to be formed by the letters placed in said row of squares.*

References Cited in the file of this patent or the original patent

UNITED STATES PATENTS

| | | |
|---|---|---|
| 832,232 | Blish | Oct. 2, 1906 |
| 1,450,829 | Anderson | Apr. 3, 1923 |
| 1,556,314 | D'Orio | Oct. 6, 1925 |
| 2,139,875 | Bronstein | Dec. 13, 1938 |
| 2,203,183 | Schuman et al. | June 4, 1940 |

OTHER REFERENCES

Everett (Publication, "Crossword Cryptogram"), May 6, 1932.